US010892499B2

(12) United States Patent
Smeltz et al.

(10) Patent No.: US 10,892,499 B2
(45) Date of Patent: Jan. 12, 2021

(54) FLOW BATTERY FLOW FIELD HAVING VOLUME THAT IS FUNCTION OF POWER PARAMETER, TIME PARAMETER AND CONCENTRATION PARAMETER

(71) Applicant: United Technologies Corporation, Hartford, CT (US)

(72) Inventors: Andrew Smeltz, Manchester, CT (US); Robert Mason Darling, South Windsor, CT (US); Michael L. Perry, Glastonbury, CT (US); Zhongfen Ding, South Windsor, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 880 days.

(21) Appl. No.: 14/768,622

(22) PCT Filed: Mar. 15, 2013

(86) PCT No.: PCT/US2013/032038
§ 371 (c)(1),
(2) Date: Aug. 18, 2015

(87) PCT Pub. No.: WO2014/142963
PCT Pub. Date: Sep. 18, 2014

(65) Prior Publication Data
US 2016/0020477 A1    Jan. 21, 2016

(51) Int. Cl.
*H01M 8/04276*    (2016.01)
*H01M 8/18*    (2006.01)
(Continued)

(52) U.S. Cl.
CPC ... *H01M 8/04276* (2013.01); *H01M 8/04186* (2013.01); *H01M 8/04992* (2013.01);
(Continued)

(58) Field of Classification Search
None
See application file for complete search history.

(56) References Cited

U.S. PATENT DOCUMENTS

| 5,318,865 A | 6/1994 | Kaneko et al. |
| 5,648,184 A | 7/1997 | Inoue et al. |
| (Continued) | | |

FOREIGN PATENT DOCUMENTS

| EP | 2395584 | 12/2011 |
| JP | S54-19228 | 7/1979 |
| (Continued) | | |

OTHER PUBLICATIONS

International Preliminary Report on Patentability for PCT Application No. PCT/US2013/032038 dated Sep. 24, 2015.
(Continued)

*Primary Examiner* — Sarah A. Slifka
(74) *Attorney, Agent, or Firm* — Carlson, Gaskey & Olds, P.C.

(57) ABSTRACT

A flow battery includes a cell that has first and second flow fields spaced apart from each other and an electrolyte separator layer. A supply/storage system is external of the cell and includes first and second vessels fluidly connected with the first and second flow fields, and first and second pumps configured to selectively move first and second fluid electrolytes between the vessels and the first and second flow fields. The flow fields each have an electrochemically active zone that is configured to receive flow of the fluid electrolytes. The electrochemically active zone has a total open volume that is a function of at least one of a power parameter of the flow battery, a time parameter of the pumps and a concentration parameter of the fluid electrolytes.

23 Claims, 1 Drawing Sheet

US 10,892,499 B2

Page 2

(51) Int. Cl.
*H01M 8/20* (2006.01)
*H01M 8/04186* (2016.01)
*H01M 8/04992* (2016.01)

(52) U.S. Cl.
CPC ............. *H01M 8/188* (2013.01); *H01M 8/20* (2013.01); *Y02E 60/50* (2013.01)

(56) References Cited

U.S. PATENT DOCUMENTS

| | | |
|---|---|---|
| 9,166,243 B2 | 10/2015 | Perry |
| 2002/0064702 A1 | 5/2002 | Gibb |
| 2008/0274393 A1 | 11/2008 | Markoski et al. |
| 2008/0292938 A1 | 11/2008 | Perry et al. |
| 2009/0136789 A1 | 5/2009 | Pien et al. |
| 2011/0020732 A1 | 1/2011 | Darling |
| 2011/0269055 A1 | 11/2011 | Perry |
| 2013/0011704 A1 | 1/2013 | Horne et al. |
| 2013/0022846 A1 | 1/2013 | Liu et al. |

FOREIGN PATENT DOCUMENTS

| | | |
|---|---|---|
| JP | 02148659 | 6/1990 |
| JP | H02-148659 | 6/1990 |
| JP | 2006-156029 | 6/2006 |
| WO | 2011075135 | 6/2011 |
| WO | 2013095378 | 6/2013 |

OTHER PUBLICATIONS

Supplementary European Search Report for European Search Report 13877546 completed Jul. 14, 2016.
File History for U.S. Appl. No. 13/513,651 now U.S. Pat. No. 9,166,243 issued Oct. 20, 2015.
Certified Translation. Japanese Publication of Examined Patent Application No. S52-102887 published Jul. 13, 1979.
Certified Translation. Japanese Unexamined Patent Application No. H2-148659 published Jun. 7, 1990.
Certified Translation. Japanese Unexamined Patent Application No. 2006-156029 published Jun. 15, 1990.
Linden, D. and Reddy, T.B. Eds. (2002). Handbook of batteries. New York, NY: McGraw-Hill. pp. 37.12, 18-23, 42.3-13, 43.11-3, Appendix A.
Laramini, J. and Dicks, A. (2003). Fuel cell systems explained. Chichester, England: John Wiley & Sons Inc. pp. xv, xvi, 18-9, 88-9, 94-6.
Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.
Aricò, A.S., Cretì, P., Baglio, V., Modica, E., and Antonucci, V. (2000). Influence of flow field design on the performance of a direct methanol fuel cell. Journal of Power Sources vol. 91. 2000. pp. 202-209.
Li, X. and Sabir, I. (2004). Review of bipolar plates in PEM fuel cells: Flow-field designs. International Journal of Hydrogen Energy vol. 30. 2005. pp. 359-371.
Negishi, A. (2003). Redox flow battery. (Certified Translation). Fuel Cells vol. 2(4). 2003. pp. 69-74.
Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-6.
Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-1416.
Wang, L. and Liu, H. (2004). Performance studies of PEM fuel cells with interdigitated flow fields. Journal of Power Sources vol. 13(2). 2004. pp. 185-196.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated flow fields. AIChE Journal vol. 46(10). Oct. 2000. pp. 2053-2064.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph.D. In re U.S. Pat. No. 9,166,243. Executed Feb. 23, 2017. pp. 1-89.
Prior Art Claim Chart for U.S. Pat. No. 9,166,243.
Ponce de León, C., Frías-Ferrer, A., González-García, Szánto, D.A., and Walsh, F.C. (2006). Redox flow cells for energy conversion. Journal of Power Sources vol. 160. 2006. pp. 716-732.
Negishi, A. (2003). Redox flow battery. Fuel Cells vol. 2(4). 2003. pp. 69-74.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.
Shigematsu, T. (2011). Redox flow battery for energy storage. SEI Technical Review No. 73. Oct. 2011. pp. 4-13.
Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.
Sumitomo Electric. Redox Flow Battery. Technical Document. Retrieved May 8, 2017 from: http://global-sei.com/products/redox/pdf/redox-flow-battery.pdf.
Petition for Inter Partes Review of U.S. Pat. No. 9,166,243. *Sumitomo Electric Industries, Ltd.*, Petitioner, v. *United Technologies Corporation*, Patent Owner. Filed Feb. 23, 2017.
International Search Report for PCT Application No. PCT/2013/032038 completed May 16, 2013.
European Search Report for European Patent Application No. 13877546 completed Jul. 14, 2016.

FLOW BATTERY FLOW FIELD HAVING VOLUME THAT IS FUNCTION OF POWER PARAMETER, TIME PARAMETER AND CONCENTRATION PARAMETER

STATEMENT REGARDING FEDERALLY SPONSORED RESEARCH OR DEVELOPMENT

This invention was made with government support under contract number DE-AR0000149 awarded by the United States Department of Energy. The government has certain rights in the invention.

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the fluid electrolytes is released in the reverse reactions and electrical energy can be drawn from the electrodes. Flow batteries are distinguished from other electrochemical devices by, inter alia, the use of externally-supplied, fluid electrolyte solutions that include reactants that participate in reversible electrochemical reactions.

SUMMARY

An example flow battery includes at least one cell having first and second flow fields spaced apart from each other, and an electrolyte separator layer arranged there between. A supply/storage system is external of the at least one cell. The supply/storage system includes first and second vessels fluidly connected with the respective first and second flow fields, and first and second pumps configured to selectively move first and second fluid electrolytes between the first and second vessels and the first and second flow fields. The first and second flow fields each have an electrochemically active zone configured to receive flow of the respective first and second fluid electrolytes. The electrochemically active zone has a total open volume that is a function of at least one of a power parameter of the flow battery, a time parameter of the respective first and second pumps and a concentration parameter of the respective first and second fluid electrolytes.

In another aspect, a flow battery includes at least one cell having a flow field adjacent an electrolyte separator layer, with a supply/storage system external of the at least one cell. The supply/storage system includes a vessel fluidly connected with the flow field and a pump configured to selectively move a fluid electrolyte between the vessel and the flow field. The flow field has an electrochemically active zone configured to receive flow of the fluid electrolyte. The electrochemically active zone has a total open volume according to Equation I:

$$V = (S \times P \times t_{pump})/(E \times F \times C), \qquad \text{Equation I:}$$

wherein V is the total open volume in Liters, S is the moles of active species reacted per electron, P is a rated maximum output power of the flow battery in Watts, $t_{pump}$ is a time in seconds for the pump to achieve full flow of the fluid electrolyte from a low-flow state, E is the minimum allowable voltage in Volts, F is Faraday's constant and C is a concentration of an electrochemically active species in the fluid electrolyte in moles per Liter.

Also disclosed is a method of managing flow battery response time to a change in power demand. The method includes, in response to a change in a power demand on the flow battery, ramping the pump from a first, low-flow state to a second, full-flow state over a time period and, prior to the pump achieving the full-flow state, providing a required electrical load corresponding to the change in the power demand.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
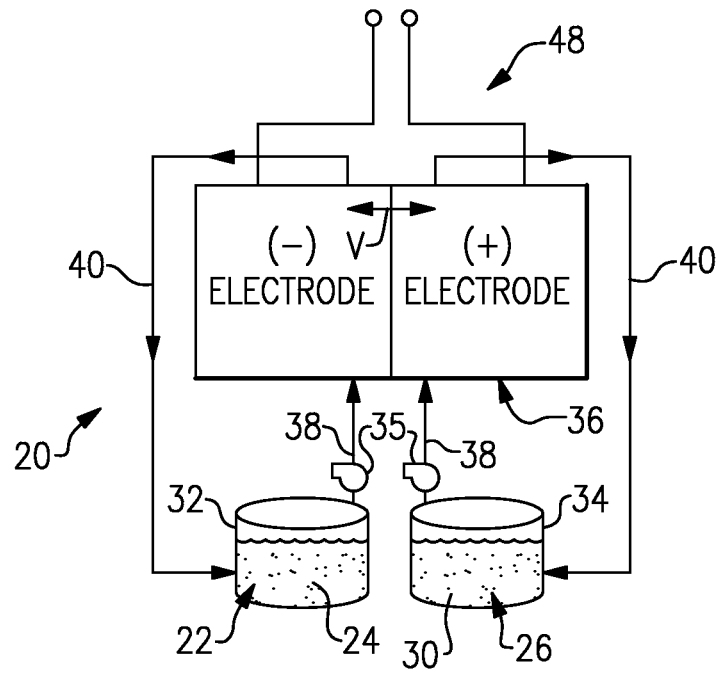
FIG. 1 shows an example flow battery.

FIG. 1 schematically shows portions of an example flow battery 20 for selectively storing and discharging electrical energy. As an example, the flow battery 20 can be used to convert electrical energy generated in a renewable energy system to chemical energy that is stored until a later time when there is greater demand, at which time the flow battery 20 then converts the chemical energy back into electrical energy. The flow battery 20 can supply the electric energy to an electric grid, for example. As will be described, the disclosed flow battery 20 includes features for enhanced durability with respect to maintaining high kinetic activity for the redox reactions at the first electrode.

The flow battery 20 includes a fluid electrolyte 22 that has at least one electrochemically active species 24 that functions in a redox pair with regard to an additional fluid electrolyte 26 that has at least one electrochemically active species 28. For example, the electrochemically active species 24/28 are based on vanadium, bromine, iron, chromium, zinc, cerium, lead, sulfur or combinations thereof. In embodiments, the fluid electrolytes 22/26 are liquid solutions that include one or more of the electrochemically active species 24/28. The first fluid electrolyte 22 (e.g., the negative electrolyte) and the second fluid electrolyte 26 (e.g., the positive electrolyte) are contained in a supply/storage system 30 that includes first and second vessels 32/34 and pumps 35.

The fluid electrolytes 22/26 are delivered using the pumps 35 to at least one cell 36 of the flow battery 20 through respective feed lines 38 and are returned from the cell 36 to the vessels 32/34 via return lines 40. The feed lines 38 and the return lines 40 connect the vessels 32/34 with first and second electrodes 42/44. Multiple cells 36 can be provided as a stack.

The cell or cells 36 each include the first electrode 42, the second electrode 44 spaced apart from the first electrode 42, and an electrolyte separator layer 46 arranged between the first electrode 42 and the second electrode 44. For example, the electrodes 42/44 are porous carbon structures, such as carbon paper or felt. In general, the cell or cells 36 can include bipolar plates, manifolds and the like for delivering the fluid electrolytes 22/26 through flow field channels to the electrodes 42/44. The bipolar plates can be carbon plates, for example. It is to be understood however, that other configurations can be used. For example, the cell or cells 36 can alternatively be configured for flow-through operation where the fluid electrolytes 22/26 are pumped directly into the electrodes 42/44 without the use of flow field channels.

The electrolyte separator layer 46 can be an ionic-exchange membrane, an inert micro-porous polymer membrane or an electrically insulating microporous matrix of a material, such as silicon carbide (SiC), that prevents the fluid electrolytes 22/26 from freely and rapidly mixing but permits selected ions to pass through to complete the redox reactions while electrically isolating the electrodes 42/44. In this regard, the fluid electrolytes 22/26 are generally isolated from each other during normal operation, such as in charge, discharge and shutdown states.

The fluid electrolytes 22/26 are delivered to the cell 36 to either convert electrical energy into chemical energy or, in the reverse reaction, convert chemical energy into electrical energy that can be discharged. The electrical energy is transmitted to and from the cell 36 through an electric circuit 48 that is electrically coupled with the electrodes 42/44.

Figure 2:
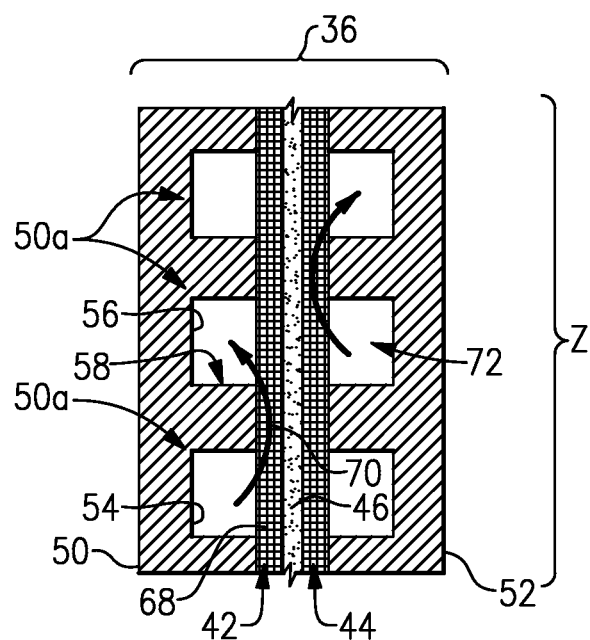
FIG. 2 shows an example cell of the flow battery of FIG. 1.

FIG. 2 shows a cross-section of a portion of the cell 36. In this example, the cell 36 includes a first bipolar plate 50 and a second bipolar plate 52 spaced apart from the first bipolar plate 50. The bipolar plates 50 and 52 are electrically conductive and can be graphite (carbon) plates or metallic plates, for example.

The first bipolar plate 50 includes a plurality of channels 50a, which include a first channel 54 and a second, adjacent channel 56 that is separated from the first channel 54 by a rib 58. In this example, the configuration of the second bipolar plate 52 is substantially similar to the first bipolar plate 50, although it is conceivable that the second bipolar plate 52 could alternatively have a dissimilar configuration.

The electrodes 42/44 are arranged immediately adjacent the respective first and second bipolar plates 50 and 52. Thus, the electrode 42 is in contact with the face of the first bipolar plate 50 and the electrode 44 is in contact with the face of the second bipolar plate 52. The separator 46 is arranged between the electrodes 42/44.

There is a trade in flow batteries between performance and pressure drop associated with the flow of the fluid electrolytes through a cell. For example, a flow battery may not utilize flow fields. In such a design, the fluid electrolytes flow entirely through porous electrodes from entrance to exit. This type of design provides either relatively poor performance with acceptable pressure drop because the electrodes are relatively thick to accommodate all of the flow through the porous media; or, relatively good performance but high pressure drop because the electrodes are thinner and the flow resistance through the entire porous electrode is relatively high which increases the parasitic loads needed to move the electrolyte through the cell. In comparison, another type of flow battery may utilize flow field channels. In such a design, the fluid electrolytes flow through the channels and diffuse into the adjacent electrodes. This type of design causes less pressure drop because the fluid electrolytes flow relatively unrestricted through the channels and the electrodes can be thinner, but the performance is relatively poor because of the relatively steep concentration gradients in the electrodes necessary to promote a high rate of diffusive transport.

The channels 50a of the bipolar plate 50 of the flow battery 20 positively force at least a portion of a flow 70 of the fluid electrolyte 22 into the electrode 42. The channels of the bipolar plate 52 operate similarly. The term "positively forcing" or forced convective flow or variations thereof refers to the structure of the bipolar plate 50 being configured to move the fluid electrolyte 22 from the channels 50a into the electrode 42 by the mechanism of a pressure gradient. In comparison, diffusion is a concentration-driven mechanism. The bipolar plate 50 thereby provides a "mixed flow" design that is a combination of the positively forced flow 70 through the electrode 42 and flow through the channels 50a to achieve a desirable balance between pressure drop and performance. The pressure drop in the electrodes is smaller than in conventional flow through designs because the path length is shorter and the flow is distributed over a larger area.

It is to be appreciated that the bipolar plate 50 can have a variety of channel arrangements and/or a channel shapes that are configured to positively force at least a portion of the flow 70 of the fluid electrolyte 22 into the electrode 42. Examples of such configurations can be found in PCT application PCT/US2011/066143, entitled FLOW BATTERY WITH MIXED FLOW, incorporated herein by reference in its entirety.

The flow battery 20 can be in any of a variety of different states with regard to being active/inactive. For example, the flow battery 20 has a shut-down state in which the fluid electrolytes 22/26 have been drained from the cell 36, for example. The flow battery 20 can also have an idle or inactive state in which the fluid electrolytes 22/26 are present in the cell 36, but the pumps 35 are turned off or are in a low-flow state such that there is no or little flow of the fluid electrolytes 22/26 through flow fields 72 of the cell 36. The flow battery 20 also has an active state in which the pumps 35 operate in a full-flow state to move the fluid electrolytes 22/26 through the flow fields 72 of the cell 36.

In transitioning between the idle state or a low-power state to a fully active state, the pumps 35 are ramped up from the low-flow state to the full-flow state. During this ramp-up time, the flow velocity of the fluid electrolytes 22/26 through the cell 36 increases until the maximum flow is reached. In comparative flow batteries where there is a change in power demand requiring the ramp-up, the moles of active species immediately available for reaction in the electrodes is too low to support the full power demand during ramp-up. As a result, if the comparison flow battery is operated in effort to try to meet the power demand, undesirable side reactions like carbon corrosion may occur. Further, the power demand cannot be met until the full-flow state is achieved, without accelerating the corrosion. This causes a delay in responding to the change in the power demand. The delay can be reduced by more rapidly ramping-up the pumps or continually running the pumps at high speed, but rapid ramp-up of the pumps at high speed can result in fluid hammers that damage components of the flow battery and running the pumps and flow battery for prolonged periods can cause unwanted parasitic power losses, self-discharge and wear on the flow battery components and pumps. Thus, there is a challenge in reducing response time of a flow battery to a change in power demand. In this regard, each of the flow fields 72 of the cell 36 of the flow battery 20 has an electrochemically active zone Z that is configured to receive flow of the fluid electrolytes 22/26. The electrochemically active zones Z each have a total open volume that is a function of at least one of a power parameter of the flow battery 20, a time parameter of the pumps 35 and a concentration parameter of the fluid electrolytes 22/26. By selecting the total open volume according to these parameters, the response time of the flow battery 20 can be reduced to provide a required electrical load corresponding to a change in a power demand.

In one example, the total open volume of each of the electrochemically active zones Z is the combined volume of the channels 50*a* of the respective bipolar plate 50 or 52 and the open volume of the electrode 42 or 44. As a further example, this total open volume can be selected during a design stage of the flow battery 20 as a function of a maximum rated power of the flow battery 20, a time parameter in seconds for the pumps 35 to achieve the full-flow state from the low-flow state, and/or the concentration of at least one of the the electrochemically active species 24/28. For example, the concentration of at least one of the the electrochemically active species 24/28 can be an estimate of the concentration of one or more of these species during the idle state of the flow battery 20.

In a further example, the total open volume of the electrochemically active zones is selected according to Equation I below:

$$V=(S \times P \times t_{pump})/(E \times F \times C_{LE}), \quad \text{Equation I:}$$

wherein V is the total open volume in Liters, S is the moles of active species reacted per electron, P is a rated maximum output power of the flow battery 20 in Watts, $t_{pump}$ is a time in seconds for the pump 35 to achieve full flow of the fluid electrolyte from a low-flow state, E is the minimum allowable stack voltage in Volts, F is Faraday's constant and C is a concentration of at least one of the electrochemically active species 24 or 28 in the fluid electrolyte 22 or 26 in moles per Liter. As an example, if voltage is below the minimum allowable stack voltage, current will exceed a limit of electronic components used with the flow battery to handle the loads. Thus, a voltage window or range can be defined for "safe" operation that avoids damaging electronic components. As can be appreciated, the value of P divided by E in Equation I can be replaced by current, I, in amperes. By selecting the total open volume in accordance with the pump parameter, the time parameter and/or the concentration parameter, a user can ensure that there is a suitable amount of the electrochemically active species 24/28 to support the required electrical load corresponding to the change in the power demand, while avoiding acceleration of corrosion.

The disclosed total open volume, including disclosed Equation I, serves to reduce the response time of the flow battery 20 to a change in the power demand. For example, because there is a suitable amount of the electrochemically active species 24/28 in the total open volume of the electrochemically active zone Z, the required electrical load can be provided in response to the change in the power demand prior to the pumps 35 reaching the full-flow state.

As will be appreciated from this disclosure, the total open volume can be varied by designing the channels 56 to be deeper or wider. The total open volume does not include the volume of manifolds that may be used to distribute the fluid electrolytes 22/26 to the channels 56 and electrodes 42/44.

Corrosion can occur at the edges of the bipolar plates 50/52 and electrodes 42/44. This corrosion can be driven by shunt currents, and the corrosion rate depends on the voltage at the edge of the active zone Z, which is proportional to the voltage in the bulk of the electrodes 42/44. The rate of carbon corrosion spikes to a relatively high value immediately after a high voltage is set in the flow battery 20. The rate then often drops with time as the carbon surface passivates. In a further example of the examples disclosed herein, a method to avoid electric current spikes includes controlling the voltage ramp rate to the maximum permitted voltage during charging. For example, controlling the voltage ramp rate can be achieved by controlling a duty cycle on mosfets in a bi-directional power convertor. This prevents exposing unprotected carbon to high potentials by giving time for protective oxides to grow. The corrosion is transpassive, and thus will continue to occur, but the net rate will be lower. In one example, in response to the change in the power demand on the flow battery 20, a voltage ramp rate is limited to limit electric current spikes in the flow battery. In a further example, the voltage ramp rate is limited to a maximum voltage during charging of the flow battery 20.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A flow battery comprising:
   at least one cell having first and second flow fields spaced apart from each other, and an electrolyte separator layer arranged there between; and
   a supply/storage system external of the at least one cell, the supply/storage system including first and second vessels fluidly connected with the respective first and second flow fields, and first and second pumps configured to selectively move first and second fluid electrolytes between the first and second vessels and the first and second flow fields,
   wherein the first and second flow fields each have an electrochemically active zone configured to receive flow of the respective first and second fluid electrolytes, the electrochemically active zone having a total open volume that is a function of at least one of a power parameter of the flow battery, a time parameter of the respective first and second pumps and a concentration parameter of the respective first and second fluid electrolytes,
   wherein the power parameter is a maximum rated power of the flow battery, the time parameter is the time in seconds for the first and second pumps to achieve full flow of the first and second fluid electrolyte from a low-flow state, and the concentration parameter is a concentration of at least one electrochemically active species in the first and second fluid electrolytes.

2. The flow battery as recited in claim 1, wherein the total open volume is a function of the power parameter.

3. The flow battery as recited in claim 1, wherein the total open volume is a function of the time parameter of the respective first and second pumps.

4. The flow battery as recited in claim 1, wherein the total open volume is a function of the concentration parameter.

5. The flow battery as recited in claim 1, wherein the total open volume is a function of the power parameter, the time parameter and the concentration parameter.

6. The flow battery as recited in claim 1, wherein the total open volume is according to Equation I:

$$V=(S \times P \times t_{pump})/(E \times F \times C), \qquad \text{Equation I:}$$

wherein V is the total open volume in Liters, S is the moles of active species reacted per electron, P is a rated maximum output power of the flow battery in Watts, $t_{pump}$ is a time in seconds for the respective first and second pumps to achieve full flow of the fluid electrolytes from a low-flow state, E is a minimum allowable voltage in Volts, F is Faraday's constant and C is a concentration of at least one electrochemically active species in the fluid electrolytes in moles per Liter.

7. The flow battery as recited in claim 1, wherein the total open volume is a total open volume in channels of the respective first and second flow fields and open volume in respective first and second porous electrodes adjacent the electrolyte separator layer.

8. A flow battery comprising at least one cell having a flow field adjacent an electrolyte separator layer, with a supply/storage system external of the at least one cell, the supply/storage system including a vessel fluidly connected with the flow field and a pump configured to selectively move a fluid electrolyte between the vessel and the flow field, the flow field having an electrochemically active zone configured to receive flow of the fluid electrolyte, the electrochemically active zone having a total open volume according to Equation I:

$$V=(S \times P \times t_{pump})/(E \times F \times C), \qquad \text{Equation I:}$$

wherein V is the total open volume in Liters, S is the moles of active species reacted per electron, P is a rated maximum output power of the flow battery in Watts, $t_{pump}$ is a time in seconds for the pump to achieve full flow of the fluid electrolyte from a low-flow state, E is a minimum allowable voltage in Volts, F is Faraday's constant and C is a concentration of at least one electrochemically active species in the fluid electrolyte in moles per Liter.

9. The flow battery as recited in claim 8, wherein the total open volume is a total open volume in channels of the flow field and open volume in a porous electrode adjacent the electrolyte separator layer.

10. A method of managing flow battery response time to a change in power demand, the method comprising:
providing a flow battery having at least one cell including a flow field adjacent an electrolyte separator layer, with a supply/storage system external of the at least one cell, the supply/storage system including a vessel fluidly connected with the flow field and a pump configured to selectively move a fluid electrolyte between the vessel and the flow field, the pump being operable between a first, low-flow state and a second, full-flow state with respect to flow of the fluid electrolyte through the flow field; and in response to a change in a power demand on the flow battery, ramping the pump from the first, low-flow state to the second, full-flow state over a time period and, prior to the pump achieving the full-flow state, providing a required electrical load corresponding to the change in the power demand.

11. The method as recited in claim 10, wherein the flow field has an electrochemically active zone configured to receive flow of the fluid electrolyte, and the providing includes establishing the electrochemically active zone to have a total open volume that is a function of at least one of a power parameter of the flow battery, a time parameter of the pump and a concentration parameter of the fluid electrolyte.

12. The method as recited in claim 11, wherein the total open volume is a function of at least the power parameter, and power parameter is a maximum rated power of the flow battery.

13. The method as recited in claim 11, wherein the total open volume is a function of at least the time parameter, and the time parameter is the time in seconds for the pump to achieve full flow of the fluid electrolyte from a low-flow state.

14. The method as recited in claim 1, wherein the total open volume is a function of at least the concentration parameter, and the concentration parameter is a concentration of at least one of the electrochemically active species in the fluid electrolyte.

15. The method as recited in claim 11, wherein the total open volume is a function of the power parameter, the time parameter and the concentration parameter.

16. The method as recited in claim 10, wherein the total open volume is according to Equation I:

$$V=(S \times P \times t_{pump})/(E \times F \times C), \qquad \text{Equation I:}$$

wherein V is the total open volume in Liters, S is the moles of active species reacted per electron, P is a rated maximum output power of the flow battery in Watts, $t_{pump}$ is a time in seconds for the pump to achieve full flow of the fluid electrolyte from a low-flow state, E is a minimum allowable voltage in Volts, F is Faraday's constant and C is a concentration of an electrochemically active species in the fluid electrolyte in moles per Liter.

17. The method as recited in claim 10, further comprising:
limiting a maximum charging rate of the flow battery to limit exposure of non-oxidized carbon surfaces to high voltage potentials.

18. The method as recited in claim 17, including limiting the voltage ramp rate to a maximum voltage during charging of the flow battery.

19. The flow battery as recited in claim 7, wherein the channels include a first channel and a second, adjacent channel that is separated from the first channel by a rib.

20. The flow battery as recited in claim 7, wherein the channels positively force at least a portion of a flow of the fluid electrolyte into one of the first and second electrodes.

21. The flow battery as recited in claim 20, wherein the channels positively force at least a portion of a flow of the fluid electrolyte into one of the first and second electrodes by the mechanism of a pressure gradient.

22. The flow battery as recited in claim 7, wherein the channels each have a depth and a width, and the total open volume is a function of the depth and width of the channels.

23. The flow battery as recited in claim 7, further comprising manifolds for distributing fluid electrolytes to the channels and electrodes, and wherein the total open volume does not include the volume of the manifolds.

* * * * *